UNITED STATES PATENT OFFICE.

GEORGE PERRY, OF NEW ORLEANS, LOUISIANA.

WEED-KILLING COMPOSITION.

SPECIFICATION forming part of Letters Patent No. 652,686, dated June 26, 1900.

Application filed November 20, 1899. Serial No. 737,659. (No specimens.)

*To all whom it may concern:*

Be it known that I, GEORGE PERRY, a citizen of the United States, residing at New Orleans, in the parish of Orleans and State of Louisiana, have invented new and useful Improvements in Liquid Compounds for Destroying Water-Hyacinth and other Water-Plants, of which the following is a specification.

My invention contemplates the provision of a simple and inexpensive liquid compound designed more particularly for destroying water-hyacinth, and one which, while highly efficient for the purpose stated, is not liable to kill or injure fish in the streams or other bodies of water where it is applied.

The compound consists of the following ingredients, combined in about the proportions stated, viz: water, one gallon; arsenic, three drachms; sodium chloride, fourteen drachms; potassium nitrate, four drachms.

In preparing the compound I add the arsenic to one-half gallon of water and heat the mixture to 212° Fahrenheit for five hours and then let the same cool until its temperature is about 100° Fahrenheit. I then add the sodium chloride and potassium nitrate and sufficient water to make one gallon of the compound and let the same stand until cool, when it is ready for use.

The purpose of the sodium chloride and potassium nitrate is to retain the arsenic in solution on the plants and assist it in working its way to the heart of the roots of a plant, so as to enable it to quickly accomplish its purpose.

The compound is preferably applied to the upper portion of the leaves of water-hyacinth when the same are in full bloom through the medium of a force-pump provided with a nozzle calculated to throw a fine spray. When thus applied, the compound will touch both the leaf and bloom of the plant and will quickly work its way to the heart of the roots. As soon as it does this the heart, which is normally snow-white, turns black and the plant as a whole is killed.

Water-hyacinth grows very thick and high, and hence it is difficult to gain access to the heart of the roots. This renders it necessary to apply the compound to the upper portions of the leaves and to employ a compound of such nature that it is adapted to remain in a moist condition on the leaves and work its way down to the heart of the roots of the plant. The thickness of the growth of the plants and the application of the compound to the upper portions of the leaves and the blooms thereof greatly lessen the liability of any of the compound reaching the water in which the plants are located. If, however, the compound reaches the water, the proportion of arsenic is so small as not to prove injurious to fish. It will be found to be highly efficient in destroying water-hyacinth and similar vegetation, but will not injure or kill fish in streams or other bodies of water where it is used.

While designed more particularly for the destruction of water-hyacinth, it is obvious that my improved compound may be used to advantage in the destruction of other obnoxious water-plants.

Having thus described my invention, what I claim is—

The herein-described liquid compound for destroying water-hyacinth and similar obnoxious water-plants, consisting of arsenic, sodium chloride, potassium nitrate and water in about the proportions specified for the purposes set forth.

In testimony whereof I have hereunto set my hand in presence of two subscribing witnesses.

GEORGE PERRY.

Witnesses:
 ALBERT CHASTANT,
 JNO. R. LEGIER.